Sept. 28, 1971  C. R. B. HARRISON  3,608,355
FLUIDIC MEANS FOR SENSING THE POSITION OF AN ARTICLE
Filed Jan. 2, 1970  2 Sheets-Sheet 1

INVENTOR.
C.R.B. HARRISON
BY Ralph W. McIntire, Jr.
ATTORNEY

United States Patent Office 3,608,355
Patented Sept. 28, 1971

3,608,355
FLUIDIC MEANS FOR SENSING THE POSITION OF AN ARTICLE
Christopher Roland Booth Harrison, London, England, assignor to Westinghouse Brake and Signal Company Limited, London, England
Filed Jan. 2, 1970, Ser. No. 207
Claims priority, application Great Britain, Jan. 22, 1969, 3,501/69
Int. Cl. G01m 19/00
U.S. Cl. 73—37   4 Claims

ABSTRACT OF THE DISCLOSURE

Fluidic detector apparatus for sensing the presence or absence of an object or article, such as a lid on a container, by conveying a succession of containers along a prescribed course in which air jet detector devices having air jet streams emitting therefrom are so positioned as to have the jet streams from one of the detector devices sense the presence or absence of a lid on each of the containers and to produce respective characteristic impulses responsively to such presence or absence, and to have the jet streams of a second detector device sense the movement of each container passing therethrough to also produce an impulse responsively thereto, the apparatus being further characterized by a fluidic control portion acting responsively to the impulses from the two detector devices for correlating such impulses to produce a single control impulse which either effects continuing movement of the conveyor or a shut-down thereof, as the situation demands.

SUMMARY OF THE INVENTION

According to the invention there is provided a detector for detecting the presence of a surface, said detector comprising a fluid flow source including a pair of fluid flow conduits defining opposed spaced orifices and a third fluid flow conduit defining a third orifice to direct a fluid flow along a path tangential to the space between said spaced orifices, sensing means responsive to the fluid pressure in one of said pair of conduits, said fluid flow source, in operation, being so mounted relative to the position of said surface that, when present, said surface deflects fluid flow from said path to disturb the interaction between fluid flows from said opposed orifices, and said sensing means being responsive to a change in fluid pressure consequent upon said disturbance.

According to the present invention there is also provided a process control apparatus in which a detector of the above type is positioned to detect the presence of a closure on a container.

The embodiments of the invention will now be described with reference to the accompanying drawings, in which:-

Figure 1:
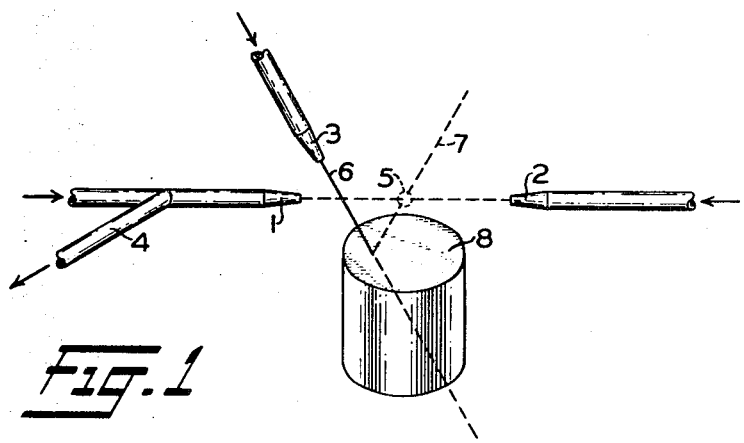
FIG. 1 shows a general arrangement of one form of detector.

Referring first to FIG. 1, there is shown a pair of opposed jets 1 and 2 and a third jet 3 all supplied with fluid, for example, air, under pressure. A branch 4 on the conduit leading to jet 1 transfers the pressure in the conduit as a control signal to a fluidic device for application in a manner to be described later. The flows of fluid from the closed jets 1 and 2 meet at an interaction zone 5 (indicated by a broken line) between the jets. This meeting maintains a reaction pressure in each of the conduits leading to the jets 1 and 2, and maintains a first defined pressure in branch conduit 4. The conduit leading to jet 3 is so directed that a flow of fluid passes tangentially to the interaction zone between the jets 1 and 2, as indicated by lines 6. This fluid flow along line 6 will have no effect on the fluid flow between the jets 1 and 2. If, however, it is deflected from line 6 along a line 7 by, for example, a surface 8 below interaction zone 5, then the incidence of fluid flow from jet 3 on the interaction zone will destroy the balance between the fluid flow from the opposed jets 1 and 2. There will no longer be any reaction in the conduits leading to these jets and the pressure in branch conduit 4 will change to a second defined value. Thus the change in pressure in the branch conduit 4 indicates whether or not the surface is present beneath the interaction zone. A particular advantage of this arrangement is that fluid pressure and outward fluid flow is always present in all jets of the detector. This reduces the ingress of dirt which can occur in detectors of the type where fluid flow is deflected to a receiving port.

Figure 2:
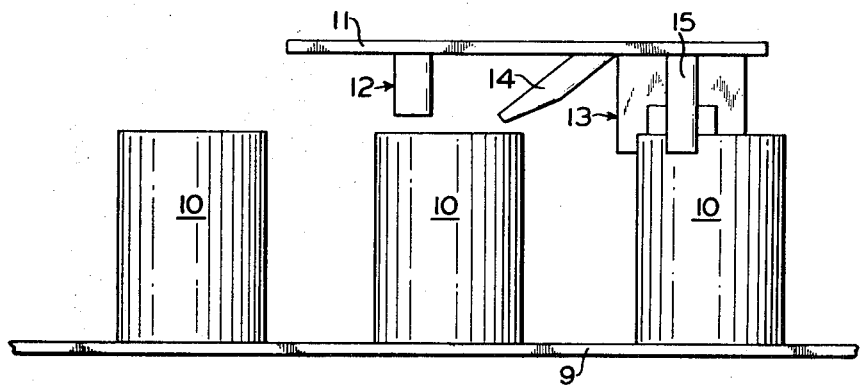
FIGS. 2 and 3 show an apparatus incorporating a detector for a particular application.
Figure 3:
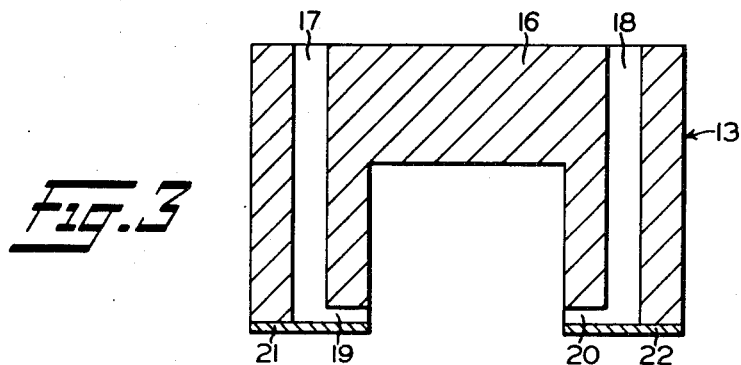

FIG. 2 shows a particular application of the detector described above, in this case to sense the presence or absence of a lid on a tin on a conveyor belt, while FIG. 3 shows the arrangement of the jets for the apparatus in FIG. 2. A conveyor belt 9 conveys the tins 10 to be checked beneath a detector mounting plate 11. The mounting plate 11 supports two opposed jet assemblies indicated at 12 and 13 mounted at right-angle disposition relative to each other. A jet 14 provides a fluid flow at an angle of approximately forty-five degrees to the vertical, while a jet 15 supplies a horizontal fluid flow to impinge on the interaction zone of jets in jet block 13. Jet blocks 12 and 13 are similar in structure, and therefore the latter only, that is, jet block 13, is shown in detail in FIG. 3. Each block consists of a substantially U-shaped portion 16 in which bores 17 and 18 are formed. In the end faces of the limbs of the U, grooves 19 and 20 are formed pointing towards each other. Cover plates 21 and 22, when attached to the limbs of the U, form the grooves 19 and 20 into conduits. Fluid pressure supply means can be arranged in known manner to connect with bores 17 and 18 when the jet blocks are mounted on the base plate 11. Jets 14 and 15 can be formed in a well-known manner, although jet 15 may preferably be formed in the same way as any one of the jets in the blocks 12 and 13. The method of forming a jet and conduit by capping a machined groove is a simple and inexpensive one, particularly where an internal change of direction is required.

In operation of the apparatus shown in FIG. 2, the tins 10 pass from left to right of the drawing along the conveyor belt. On passing under jet 14, the lid of the tin, if present, deflects the fluid flowing from the jet upwards towards the interaction zone of the jets in jet block 12. The disturbance of the interaction between the jets in the jet block is sensed in a similar manner as described with reference to FIG. 1. If, however, there is no lid on the tin passing under jet 14, there is no deflection of the angled fluid flow towards jet block 12, and therefore, no change of pressure will be sensed. The movement of the conveyor 9 carries the tin 10 towards jet block 13. There the tin passes between jet block 13 and jet 15, the tin height being such as to interrupt the horizontal flow from jet 15 to the interaction zone of the jets in jet block 13. The presence of the tin between jet 15 and jet block 13 will therefore be indicated by a change in pressure in the opposite direction to that used to indicate the presence of the tin beneath the jet block 12. Jet 14 is directed away from jets in block 13 and jet 15 to reduce stray coupling or impingement.

By correlating the signals from jet blocks 12 and 13 with the rate of movement of the conveyor, it is possible to determine whether the tins sensed at jet block 13 have or have not lids attached to them. It will be apparent that such a device is most useful when the conveyor 9 passes tins from a filling and lid fitting machine to an automatic packing machine, as when an automatic packing machine is supplied with filled tins without lids, results are disastrous.

Figure 4:
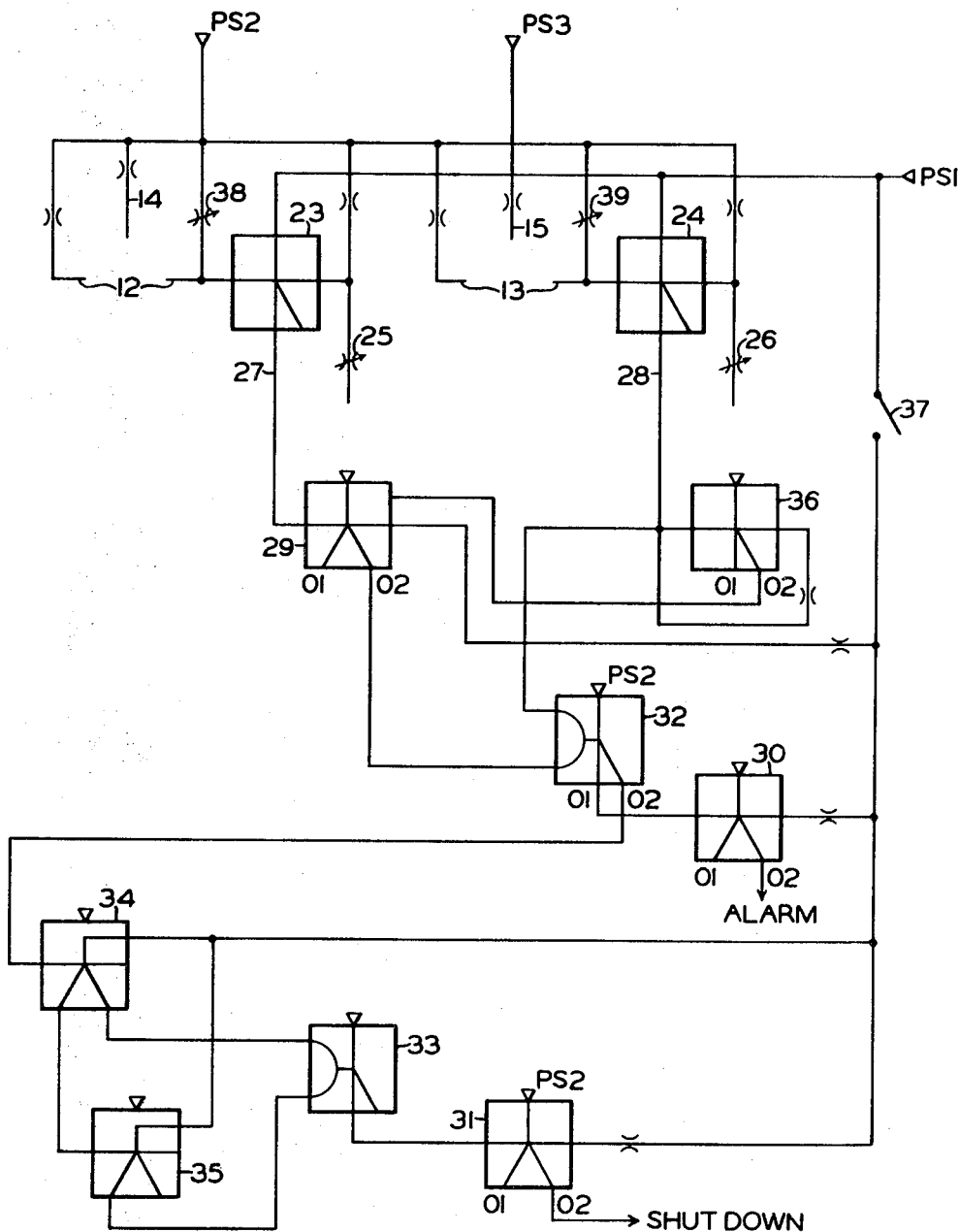
FIG. 4 shows a circuit diagram of an apparatus incorporating the detector.

A circuit arrangement to carry out the detection of tins without lids and initiate suitable corrective measures is shown in FIG. 4. This arrangement incorporates several fluidic devices which are particularly suitable for use with the detector described so far. It would, however, be possible to replace some or many of these with equivalent electronic devices.

The operation of the arrangement shown in FIG. 4 is as follows. Fluid at a constant supply pressure $Ps2$ of about five p.s.i.g. is connected to jets 12, 13 and 14. Fluid at a higher constant supply pressure $Ps3$, of about 10 p.s.i.g., is connected to jet 15 (the higher pressure is required to span the path some six inches wide allowed for passage of a tin). A third constant pressure fluid supply $Ps1$ of about three p.s.i.g. is connected to fluidic Schmitt trigger circuits 23 and 24 and their associated bias circuits 25 and 26, respectively. A branched supply conduit as shown in FIG. 1 supplies reaction pressure from one jet in each of jet blocks 12 and 13 to the respective Schmitt trigger circuits. The connections to Schmitt trigger 23 are such that an output is obtained over a circuit 27 only when no reaction is present at the control input and the bias pressure is sufficient to turn over the Schmitt trigger; this corresponds to the presence of a lid on a tin at the sensing point on the conveyor. Schmitt trigger 24 is connected in a similar manner so that an output signal over a circuit 28 corresponds to the absence of a tin at that sensing point. The two output signals are connected to a fluid logic operational circuit which is arranged to shut the conveyor down and sound the alarm when a fault condition is detected on the conveyor. The fluid logic circuit includes three flip flops 29, 30 and 31, two gates 32 and 33, two binary counters 34 and 35, and a one-shot element 36. A reset control 37 can be operated to set the flip flops and the binary counters to their initial state when starting the circuit. The circuit elements and the reset control are energized with the supply pressure $Ps1$, except for elements 31 and 32. These are energized at $Ps2$, in the case of element 32 to drive binary counter 34 properly and in the case of element 31 to provide a high output signal level as the shut down control may be up to 100 feet away. When there are no tins or lids present on the conveyor, the flip flop 29 is in the O1 condition while gate 32 is maintained in the O2 condition by the signal over circuit 28. The presence of a lid under jet block 21 operates Schmitt trigger 23 changing flip flop 29 to the O2 output state. Gate 32 remains in the O2 output condition as the flip flop 29 merely augments the signal over circuit 28. Onward movement of the tin to jet block 13 causes the output of Schmitt trigger 24 to change and the signal over circuit 28 to be changed in turn. Gate 32 is unaffected by this change of signal and its condition is maintained by flip flop 29, but further movement of the conveyor removes the tin from the area of jet block 13 and the signal of circuit 28 reverts to its original state. One shot element 36 is responsive only to a change of signal in this direction and produces a 10-millisecond pulse on output O2 which is applied to a reset input of 29. In this way the passage of a tin with a lid along the conveyor is sensed and then resets the sensing arrangement without providing a change of output signal at gate 32. If, however, there is no lid on the tin, no signal is conveyed over circuit 27 to change the state of flip flop 29. The subsequent removal of the signal to gate 32 by the presence of the tin under jet block 13 means that gate 32 is no longer maintained in the O2 condition as the output from flip flop 29 is still in the O1 stage. The output of gate 32 changes to the O1 state and operates the flip flop 30 to give an alarm signal on output O2. The onward passage of the tin along the conveyor past jet block 13 is sensed and causes a reset signal to flip flop 29 as described above although this flip flop should still be in the O1 state. The change of state of gate 32 is also registered in the two-stage binary counter formed by circuit elements 34 and 35. As the sensing circuit formed by jet blocks 12 and 13 has been reset, any further tins without lids that pass along the conveyor will cause operations of gate 32. These operations will be counted by the binary counters 34 and 35 which have a capacity of three. After three counts have been registered in the binary counters, then gate 33 is operated to switch flip flop 31 to its O2 condition. Change of state of flip flop 31 operates a shut down control for the conveyor to prevent further tins passing along it. The two levels of protection provided by the alarm and the shut down control are desirable: a single tin without a lid whose presence has been indicated by the alarm can be removed, but a continuous string of tins without lids indicates something more serious is wrong, and it is desirable that the line should be shut down before damage is caused. An alarm which does not cause a shut down of the whole line is cleared by the operation of reset control 37 which operation also clears the whole binary counter. When the conveyor is restarted after the shut down initiated by flip flop 31, reset control 37 is also operated to restore all the circuit elements to their initial state.

The arrangements of jets shown in FIGS. 2 and 3, in which they are mounted on a base plate, is particularly suitable for use where the size of the tin to be supervised varies. By moving the base plate vertically with respect to the conveyor the device can be quickly adjusted to cope with the particular batch of one size of tins. Since the tin sensing and lid sensing jets are at fixed distances from each other, no adjustments are necessary. The particular form of jet block construction shown in FIG. 3 is most useful where it is required to have jets very close to the surface of the tin to ensure maximum sensitivity with minimum air flow. In one embodiment of the detector, the jets formed by the grooves machined into the ends of the limb of the U-shaped block were $\frac{1}{16}$ inch square and the orifices of the jets were $\frac{3}{4}$ inch apart. The supply pressure of five p.s.i.g., the jet block 12 was positioned $\frac{1}{8}$ inch above the surface of the tin to be examined. Jet 14 was a jet 0.9 millimeter in diameter mounted at an angle of 45° to the vertical. Jet 15 was mounted about 5½ inches away from jet block 13, this being the diameter of the largest tin to be examined. Adjustable chokes 25, 38, 26 and 39 were provided in association with the Schmitt triggers of FIG. 4 to set up the control and bias signal levels. Chokes 25 and 26 can be positioned on the supply side of the bias input if required for a different range of pressure. When the lid sensing jets are correctly positioned and the supply pressures adjusted, then the air from jet 14, when directed towards a tin without a lid, dissipates in the open mouth of the tin without interacting with the jets 12.

In the above description, detectors in which the interacting jets are normally interrupted or normally uninterrupted have both been described in particular applications, but this does not limit the application of one type of jet to the particular application described.

Having now described the invention, what I claim as new and desire to secure by Letters Patent is:

1. Fluidic detector apparatus for sensing the presence of an object passing therethrough along a prescribed path, said detector apparatus comprising:
   (a) conveyor means for conveying objects along said prescribed path;
   (b) first detector means mounted in a fixed position relative to said prescribed path for detecting the presence of a preselected surface on each of said objects and producing a first impulse responsively to the absence of said preselected surface;
   (c) second detector means mounted in a fixed position relative to said prescribed path and in spaced relation to said first detector means for detecting the presence of each of said objects and producing a second impulse responsively to such presence; and (d) means responsive to successive occurrence of said first impulse and said second impulse for correlating and combining such successive impulses into a control impulse.

2. Fluidic detector apparatus, as set forth in claim 1, further characterized by alarm means actuated responsively to said control impulse.

3. Fluidic detector apparatus, as set forth in claim 1, further characterized by counting means effective responsive to a preselected number of successive control impulses for effecting a shut-down of said conveyor means.

4. Fluidic detector apparatus, as set forth in claim 1, wherein:

(a) said first detector means comprises:
  (i) a first pair of oppositely disposed fluid jets directing a pair of fluid jet streams in opposite colinear directions toward a point of impact, and
  (ii) a third fluid jet directing a third fluid jet stream along a normal path toward a fixed point in a fixed plane relative to said prescribed path, the path of said third jet stream being deflectable, by the presence of said preselected surface lying in said fixed plane, to a different path intersecting said point of impact to produce a normal disturbance thereat; and (b) said second detector means comprises:
  (i) a second pair of oppositely disposed fluid jets directing a second pair of fluid jet streams in opposite colinear directions toward a second point of impact, and
  (ii) a sixth fluid jet directing a sixth fluid jet stream along an intersecting path toward said second point of impact to produce a disturbance thereat, said sixth fluid jet stream being disposed such as to be interrupted by each of said objects moving along said prescribed path for interrupting said disturbance at said second point of impact to effect said second impulse.

References Cited

UNITED STATES PATENTS 3,413,839   12/1968   Clark et al. _____ 73—37
3,415,268   12/1968   Tweed _____ 73—37X

FOREIGN PATENTS 724,028   12/1965   Canada _____ 73—37

LOUIS R. PRINCE, Primary Examiner

W. A. HENRY, Assistant Examiner